United States Patent
Haerdtl

(10) Patent No.: US 10,414,399 B2
(45) Date of Patent: Sep. 17, 2019

(54) CONTROL UNIT AND METHOD FOR PREVENTING AN UNDESIRED VEHICLE MOTION

(71) Applicant: Bayerische Motoren Werke Aktiengesellschaft, Munich (DE)

(72) Inventor: Sebastian Haerdtl, Oberhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 76 days.

(21) Appl. No.: 15/668,951

(22) Filed: Aug. 4, 2017

(65) Prior Publication Data

US 2017/0327119 A1  Nov. 16, 2017

Related U.S. Application Data

(63) Continuation of application No. PCT/EP2016/051885, filed on Jan. 29, 2016.

(30) Foreign Application Priority Data

Feb. 5, 2015 (DE) .......................... 10 2015 202 093

(51) Int. Cl.
  *B60W 30/18* (2012.01)
  *B60T 7/12* (2006.01)
  (Continued)

(52) U.S. Cl.
  CPC ............ *B60W 30/181* (2013.01); *B60T 7/122* (2013.01); *B60W 10/06* (2013.01); *B60W 10/18* (2013.01);
  (Continued)

(58) Field of Classification Search
  CPC .... B60W 30/181; B60W 10/06; B60W 10/18; B60W 30/18018; B60W 30/18118;
  (Continued)

(56) References Cited

U.S. PATENT DOCUMENTS

| 6,439,675 B1 | 8/2002 | Zechmann et al. |
| 2002/0028726 A1 | 3/2002 | Morimoto et al. |

(Continued)

FOREIGN PATENT DOCUMENTS

| CN | 102959213 A | 3/2013 |
| CN | 103707864 A | 4/2014 |

(Continued)

OTHER PUBLICATIONS

German-language Search Report issued in counterpart German Application No. 10 2015 202 093.2 dated Sep. 11, 2015 with partial English translation (12 pages).

(Continued)

*Primary Examiner* — Aaron L Troost
(74) *Attorney, Agent, or Firm* — Crowell & Moring LLP

(57) ABSTRACT

A method and a corresponding device are provided for preventing an undesired vehicle motion during an automatic switch-off process of a drive machine in a motor vehicle. An automatic switch-off process is initiated by a start-stop apparatus before the standstill is reached if the motor vehicle is braked because of a deceleration request and the speed of the vehicle is less than a specified first speed threshold. A brake pressure of suitable magnitude is caused to be locked-in in the brake system even before the vehicle reaches the standstill if a first signal indicating that the vehicle standstill will soon be reached and a second signal indicating that an inability of the drive machine to operate in a self-sustaining manner will soon be reached are acquired because of an initiated automatic switch-off process of the drive machine.

17 Claims, 2 Drawing Sheets

(51) Int. Cl.
*F02N 11/08* (2006.01)
*B60W 10/06* (2006.01)
*B60W 10/18* (2012.01)

(52) U.S. Cl.
CPC ............... *B60W 30/18018* (2013.01); *B60W 30/18118* (2013.01); *F02N 11/0818* (2013.01); *F02N 11/0822* (2013.01); *B60W 2510/182* (2013.01); *B60W 2520/04* (2013.01); *B60W 2520/10* (2013.01); *B60W 2540/12* (2013.01); *B60W 2550/142* (2013.01); *B60W 2710/06* (2013.01); *B60W 2710/182* (2013.01); *F02N 2200/0801* (2013.01); *F02N 2200/102* (2013.01); *Y02T 10/48* (2013.01)

(58) Field of Classification Search
CPC ....... B60W 2510/182; B60W 2520/04; B60W 2520/10; B60W 2540/12; B60W 2550/142; B60W 2710/06; B60W 2710/182; B60T 7/122; F02N 11/0818; F02N 11/0822; F02N 2200/0801; F02N 2200/102; Y02T 10/48
See application file for complete search history.

(56) References Cited

U.S. PATENT DOCUMENTS

| | | | |
|---|---|---|---|
| 2010/0017070 A1* | 1/2010 | Doering | B60W 30/02 701/48 |
| 2010/0228460 A1 | 9/2010 | Saito | |
| 2011/0136624 A1 | 6/2011 | Kim et al. | |
| 2011/0190095 A1 | 8/2011 | Bollig et al. | |
| 2011/0238284 A1 | 9/2011 | Bollig et al. | |
| 2014/0100752 A1 | 4/2014 | Ito et al. | |
| 2014/0229085 A1* | 8/2014 | Moriya | B60W 10/06 701/70 |
| 2014/0336907 A1 | 11/2014 | Mori et al. | |
| 2016/0257287 A1* | 9/2016 | Kato | B60T 7/12 |
| 2016/0297443 A1* | 10/2016 | Kato | B60T 7/122 |
| 2017/0291606 A1* | 10/2017 | Yamada | F02D 29/02 |

FOREIGN PATENT DOCUMENTS

| | | |
|---|---|---|
| CN | 103998751 A | 8/2014 |
| DE | 199 50 034 A1 | 4/2001 |
| DE | 100 23 331 A1 | 6/2001 |
| DE | 10 2008 020 843 A1 | 10/2009 |
| DE | 10 2008 061 790 A1 | 7/2010 |
| DE | 10 2010 000 615 A1 | 9/2010 |
| DE | 10 2008 061 791 A1 | 11/2010 |
| DE | 10 2009 042 032 A1 | 3/2011 |
| DE | 10 2011 080 172 A1 | 2/2013 |
| DE | 10 2011 080 775 A1 | 2/2013 |
| DE | 10 2012 208 917 A1 | 11/2013 |
| EP | 2 719 598 A1 | 4/2014 |

OTHER PUBLICATIONS

International Search Report (PCT/ISA/210) issued in PCT Application No. PCT/EP2016/051885 dated Jun. 13, 2016 with English translation (7 pages).
German-language Written Opinion (PCT/ISA/237) issued in PCT Application No. PCT/EP2016/051885 dated Jun. 13, 2016 (5 pages).
Chinese-language Office Action issued in counterpart Chinese Application No. 201680006618.6 dated Feb. 19, 2019 with English translation (eight (8) pages).

* cited by examiner

CONTROL UNIT AND METHOD FOR PREVENTING AN UNDESIRED VEHICLE MOTION

CROSS REFERENCE TO RELATED APPLICATIONS

This application is a continuation of PCT International Application No. PCT/EP2016/051885, filed Jan. 29, 2016, which claims priority under 35 U.S.C. § 119 from German Patent Application No. 10 2015 202 093.2, filed Feb. 5, 2015, the entire disclosures of which are herein expressly incorporated by reference.

BACKGROUND AND SUMMARY OF THE INVENTION

The invention relates to a control unit and a method for preventing an undesired vehicle motion during an automatic switch-off process of a drive machine in a motor vehicle.

At the present time, internal combustion engines are normally switched off manually by the driver by means of an ignition key. One exception is represented by a method which is presented in DE 100 23 331 A1. Here, instead of the ignition key, the brake pedal position or the brake pedal pressure is evaluated. The switch-off process of the internal combustion engine is initiated when, after the motor vehicle has reached a standstill, the brake pedal is actuated more forcefully in its already actuated position. In order to travel onward, the brake pedal is released and the gas pedal is pressed, after which a start of the internal combustion engine is initiated. The disadvantage with such a method is that only the motor vehicle driver is responsible for switching off the internal combustion engine. Analyses of the current driving behavior show that, despite an increase in environmental awareness and increased fuel prices, switching off the internal combustion engine manually, for example at traffic signals, is seldom carried out independently.

In order to reduce fuel consumption and pollutant emissions, systems are already used in vehicles which automatically switch off the internal combustion engine of a motor vehicle under specific preconditions or in the presence of predefined switch-off conditions and switch on automatically again when predefined switch-on conditions are present. Methods and systems of this type and start-stop devices are primarily suitable for city traffic for reducing the fuel consumption since, in city traffic, the vehicle often comes to a standstill at traffic signals or because of the traffic, and the operation of the internal combustion engine is not required.

At the present time, individual vehicle manufacturers utilize various switch-off and switch-on logics with different advantages. For example, there are vehicles with automatic transmissions on the market in which the motor is switched off automatically when the driver has braked the vehicle to a standstill. The motor is started again as soon as the brake pedal is released. Another switch-off logic in automatic vehicles provides for the motor to be switched off only after about one second after a standstill has been reached.

Furthermore, DE 10 2008 061 790 A1 discloses an automatic switch-off logic for automatic vehicles having a delay circuit at a standstill, wherein, in addition, a holding function can be activated at the earliest after a standstill has been reached (=zero speed is measured). DE 10 2008 061 791 A1 reveals a similar method, wherein a so-called auto-hold function is activated when the brake pedal is released when the vehicle is at a standstill or when the vehicle has reached a standstill or when an automatic switch-off process is carried out.

Furthermore, DE 10 2010 000 615 A1 discloses an automatic switch-off logic for automatic vehicles, wherein the motor is switched off when the speed falls below a predefinable value (e.g. 20 km/h). If, in the further course, that is to say while the motor is off, a zero speed is measured (actual speed can be unequal to zero because of sensor inaccuracies), a braking control with successive increasing of the braking force to maintain the standstill is built up.

The object of the invention is, then, to provide a control unit and a corresponding method which prevent an undesired vehicle motion during an initiated automatic switch-off process of the drive machine, in particular when the switch-off process is discontinued.

According to the invention, this and other objects are achieved by a control unit and a method in accordance with embodiments of the invention.

The invention is based on the consideration of providing a switch-off logic in which the motor is stopped directly when the vehicle reaches a standstill, in order to conceal the shaking of the motor as it stops with a stopping jerk, i.e. the automatic switch-off process is already initiated shortly before the vehicle standstill is reached, so that the stopping of the motor coincides approximately with the vehicle reaching a standstill.

However, if, during the switch-off process, which is triggered with the brake pedal actuated, the driver releases the brake pedal because he wishes to travel onward (so-called change-of-mind situation) before the vehicle standstill has been reached, the vehicle is no longer secured against rolling back. The driver is possibly already actuating the accelerator and accordingly cannot himself also prevent the rollback.

Taking the above consideration into account, the first aspect of the invention is directed to a control unit for preventing an undesired vehicle motion during an automatic switch-off process of a drive machine in a motor vehicle, wherein an automatic switch-off process is initiated via a start-stop device before the standstill is reached if the motor vehicle is braked because of a deceleration request (on account of manual brake actuation or on account of automatic brake actuation from a driver assistance system), and in particular the speed of the vehicle is less than a predefined first (fixed or variable) speed threshold, so that the drive machine has been or is switched off approximately as the vehicle reaches a standstill (or when a vehicle standstill is detected). According to the invention, the control unit comprises a module for acquiring a first signal indicating that the vehicle standstill will soon be reached, a module for acquiring a second signal indicating that the inability of the drive machine to operate in a self-sustaining manner will soon be reached because of an initiated automatic switch-off process of the drive machine, and a module for causing a brake pressure of a suitable level (that is to say a variably predefinable brake pressure) in the braking system to be locked in when the first and second signal are acquired.

If, therefore, it is established that, because of an automatically initiated shut-off process, it is anticipated that the motor will shortly no longer be able to operate in a self-sustaining manner (that is to say cannot start again without an appropriate starting device) and the vehicle standstill is imminent (but has not yet been reached), the brake pressure is locked in at a suitable level even before the vehicle standstill is reached and this pressure is maintained until the subsequent automatic switch-on process of the drive machine has been completed and a drive torque is provided at such a level that the vehicle can no longer roll backward or is again travelling forward. The vehicle is thus braked at a safe standstill, specifically even if the driver himself is no longer pressing on the brake pedal or a corresponding deceleration request is present. The imminent reaching of the vehicle standstill can be established, for example, if, by using evaluated signals, it is detected or suspected that the vehicle standstill will be reached within a defined time window, for example within about 500 ms.

As a further safeguard, a third signal relating to the speed falling below a predefined second speed threshold can advantageously be acquired by appropriate measures, and locking-in of the brake pressure at a suitable level can be caused only if, in addition to the two aforementioned signals, the third signal is acquired, if therefore the current vehicle speed is less than the predefined second speed threshold. This second speed threshold can be predefined fixedly at, for example, 3 km/h, or variably.

As a further safeguard, additionally or alternatively to evaluating the third signal by appropriate measures, a fourth signal relating to a predefined slope threshold of the roadway can advantageously be acquired, and locking-in of the brake pressure at a suitable level can be caused only if, in addition to the two aforementioned signals (and possibly the third signal), the fourth signal is also acquired, if therefore it is detected that the current roadway slope is greater than a predefined slope threshold. This condition is advantageous since, in particular in the case of greater slopes, there is a risk of rolling back when the brake is released. This slope threshold can be predefined fixedly at, for example, 1.5% slope, or variably.

Since the risk of rolling back generally exists only when the driver releases the brake pedal during the switch-off process, since he wishes to travel onward, the brake pedal actuation can additionally be monitored. For this purpose, measures can advantageously be provided which acquire a fifth signal relating to the brake pedal actuation, and locking-in of the brake pressure can then be caused at the latest when a release of the brake pedal or a released brake pedal is acquired.

In a particularly advantageous refinement of the invention, the level of the brake pressure to be locked in is taken from a characteristic curve, which predefines an appropriate braking torque as a function of the slope. More brake pressure is locked in, the greater the slope is. The corresponding brake pressure is then given by the frictional value of the brakes (so-called cp value).

Advantageously, the locked-in brake pressure is withdrawn when an undesired vehicle motion is no longer possible. Since, in the so-called change-of-mind case, this is generally no longer to be feared when a sufficient drive torque can be provided, the locked-in brake pressure is advantageously cancelled or withdrawn only when a sixth signal relating to a defined drive torque of the drive machine being exceeded is acquired. Alternatively, the locked-in brake pressure can also be withdrawn when the vehicle can be kept at a standstill on the basis of other actuators.

In a manner analogous to the control unit according to the invention, a second aspect of the invention is directed to a corresponding method for preventing an undesired vehicle motion during an automatic switch-off process of a drive machine in a motor vehicle, wherein, via a start-stop device, an automatic switch-off process is initiated before the standstill is reached if the motor vehicle is braked because of a (manual) deceleration request and, in particular, the speed of the vehicle is less than a predefined first speed threshold, so that the drive machine has been or is switched off approximately as the vehicle standstill is reached. The method according to the invention further provides that a first signal indicating that the vehicle standstill will soon be reached and a second signal indicating that the inability of the drive machine to operate in a self-sustaining manner will soon be reached because of an initiated automatic switch-off process of the drive machine can be acquired. If the first and second signal are acquired, a brake pressure of suitable level in the braking system will be caused to be locked in.

The above explanations relating to the control unit of the invention according to the first aspect of the invention apply in a corresponding way to the method of the invention according to the second aspect of the invention.

The method according to the invention and advantageous refinements thereof can be carried out by means of a processor implemented algorithm or an appropriate subassembly arrangement in a control unit provided for the purpose, in particular in a brake control device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
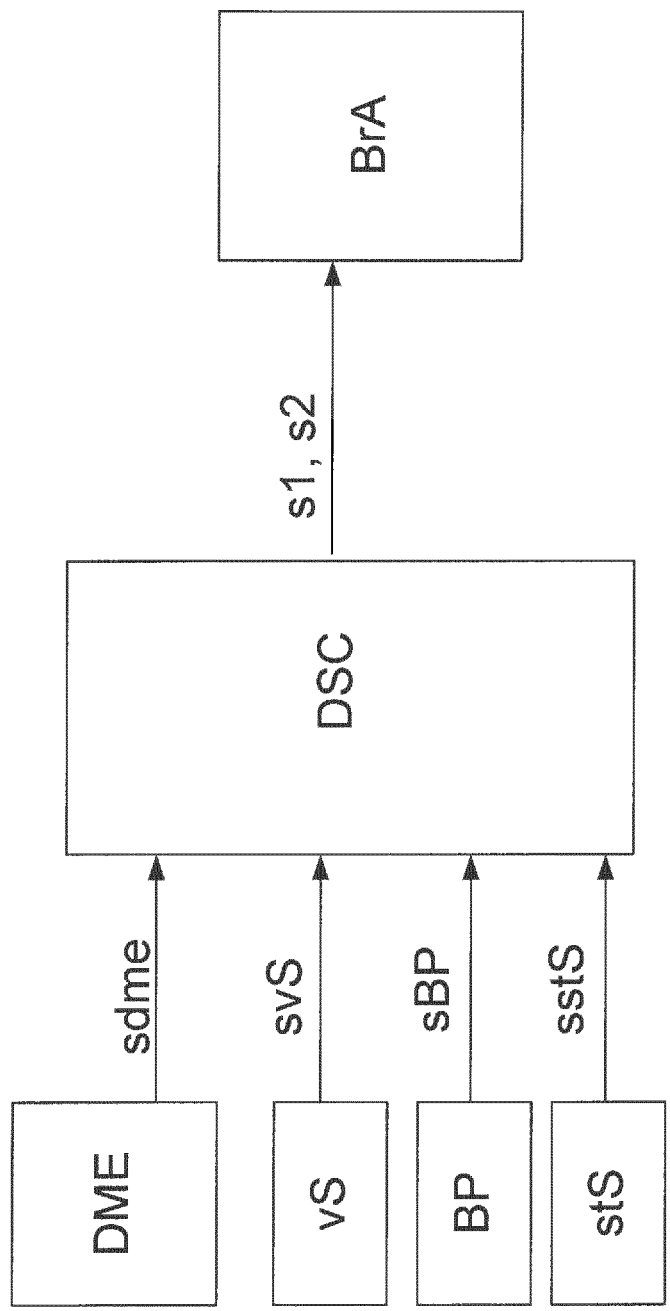
FIG. 1 is a schematic diagram showing an interconnection of various control and functional units in order to illustrate an embodiment of the invention.

FIG. 1 shows, as a central element, a control unit DSC, which receives various input signals sdme, svS, sBP and sstS and sends out drive signals s1 and s2 to brake actuators BrA. In detail, for this purpose the control unit DSC is connected to a motor control device DME, at least one speed sensor vS, a brake pedal sensor BP and a sensor evaluation unit stS for determining the slope, in such a way that the control unit DSC can acquire a signal sdme from the motor control unit DME, a speed signal svS from the at least one speed sensor vS, a brake pedal actuation signal sBP from the brake pedal sensor, and a slope signal sstS from the sensor evaluation unit stS.

The sensor evaluation unit stS can either be a slope sensor, which can detect the slope by use of sensors, or a combination of an acceleration sensor with an appropriate evaluation unit for determining the slope by calculation from a signal from the acceleration sensor. Thus, in the case of an acceleration sensor which is able to measure accelerations in the x, y and z directions, the slope of the roadway can be determined, at least approximately, from the measured acceleration in the x direction, by using appropriate algorithms and taking into account the motor torque present, the deceleration behavior (calculated from the derivative of the wheel speeds) and possibly further input parameters.

Instead of a single speed sensor vS for determining the vehicle speed, it is also possible for a plurality of individual speed sensors (e.g. four) to be installed on the wheels of the vehicle, wherein the vehicle speed is determined from the signals from all the speed sensors by use of a suitable method.

Likewise, instead of a brake pedal actuation sensor BP, the brake pedal actuation signal sBP can be determined from a measured driver pilot pressure built up by the driver via the brake pedal.

These signals sdme, svS, sBP and sstS are evaluated in the control unit DSC to see whether, in order to prevent an undesired vehicle motion during an automatically initiated switch-off process of the drive machine, locking-in of the brake pressure (at a suitable level) must be carried out or when the locked-in brake pressure can be withdrawn again. If the brake pressure is to be locked in, the control unit DSC sends a signal s1 to the brake actuators BrA locking in the brake pressure, wherein the signal s1 also already contains the information as to the level at which the brake pressure is to be locked in. If the brake pressure is to be withdrawn, a signal s2 is sent to the brake actuators.

Figure 2:
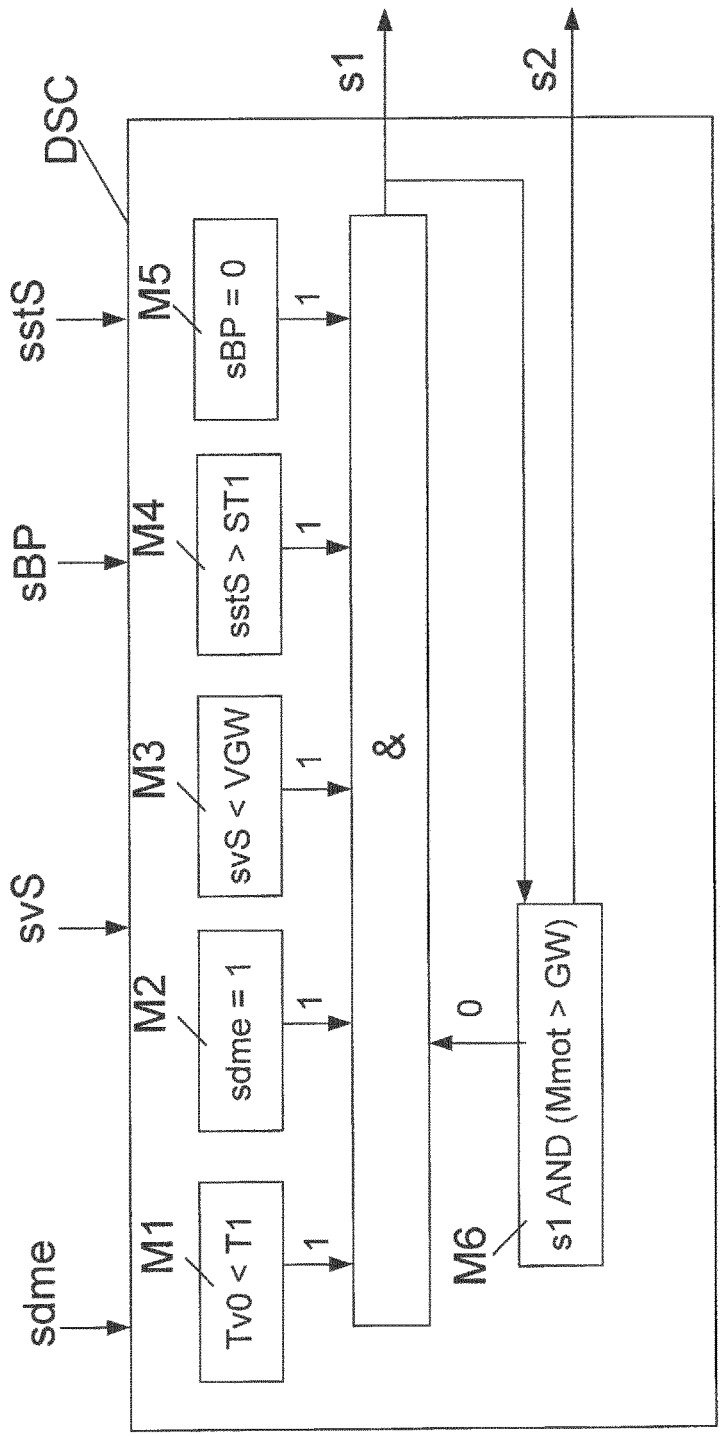
FIG. 2 shows a detailed illustration of a control unit according to an embodiment of the invention for preventing an undesired vehicle motion during an automatic switch-off process of a drive machine.

FIG. 2 shows a detailed illustration of a control unit DSC according to the invention. As already explained with respect to FIG. 1, the control unit DSC is supplied with various input signals sdme, svS, sBP and sstS, which are taken into account appropriately in the control unit DSC.

In particular, provided in the control unit DSC is a first module M1, which detects a signal Tv0 relating to the time of the imminent vehicle standstill, which in turn can be determined by taking the speed signal svS into account. If the determined time or the determined time period Tv0 is less than a predefined first time period limiting value T1 (e.g. less than 500 ms), the fact that the vehicle standstill will be reached soon (Tv0<T1) is detected and a signal "1" is sent to an AND logic unit &.

Also provided is a second module M2, which detects a signal sdme indicating that the inability of the drive machine to operate in a self-sustaining manner will soon be reached. This signal is determined in the motor control unit and transmitted from there to the critical control unit DSC. If this signal sdme is acquired, a signal "1" is sent to an AND logic unit &. Alternatively, the motor control device can also transmit a general signal about the time at which the inability of the drive machine to operate in a self-sustaining manner will be reached. The critical control unit DSC would then determine when the time of reaching the inability to operate in a self-sustaining would be less than a predetermined second time period limiting value. As soon as this has been determined, the fact that the inability of the drive machine to operate in a self-sustaining manner s will soon be reached would be detected and a signal "1" is sent to the AND logic unit &.

Also provided is a third module M3, which acquires a speed signal svS. If the acquired speed svS is less than a predefined speed threshold VGW, the fact that the speed has fallen below the predefined speed threshold (svS<VGW) is therefore detected, a signal "1" is likewise sent to the AND logic unit &.

Also provided is a fourth module M4, which acquires a slope signal sstS. If the acquired slope sstS is greater than a predefined slope threshold ST1, the fact that the predefined slope threshold ST1 has been exceeded (sstS>ST1) is detected and a signal "1" is likewise sent to the AND logic unit &.

Also provided is a fifth module M5, which acquires a signal sBP for determining the position of the brake pedal. If the acquired signal sBP is zero, the fact that the brake pedal has been released is detected and a signal "1" is likewise sent to the AND logic unit &.

Finally, a sixth module M6 is also provided, which sends a "0" to the AND logic unit & when it is established that the control unit DSC sends out a signal s1 and the drive machine provides a motor torque Mmot which is greater than a predefined limiting value GW. The limiting value GW is defined in such a way that, when the limiting value GW is exceeded, the drive torque Mmot is so high that the vehicle at least cannot roll backward because of the drive torque Mmot. This limiting value GW depends on the slope and vehicle mass and is continuously re-determined. If this condition is not fulfilled, the sixth module M6 sends a "1" to the AND logic unit &.

The AND logic unit then evaluates all the input signals from all the modules M1 to M6 to the effect that when all the conditions are present, that is to say when only "1" is received, said unit sends a signal s1 to brake actuators, which then maintain the last applied brake pressure in order to prevent the vehicle from rolling back.

As soon as the AND logic unit & sends out the signal s1, a check is made by means of the sixth module M6 as to when (after the drive machine has been started) there is a drive torque Mmot from the drive machine which exceeds the relevant limiting value GW. As soon as such a drive torque is reached, the sixth module M6 sends a signal s2 to the brake actuators to cancel the locked-in brake pressure. At the same time, because of the lack of an AND logic unit & (the sixth module M6 sends out a 0), the signal s1 is withdrawn.

As an alternative to the evaluation logic illustrated here (AND logic unit & and module M6), the evaluation logic can also be constructed in such a way that the initial conditions (for canceling the brake pressure) are defined separately. Omission of one input condition (which is evaluated with regard to the build-up of the brake pressure) would then not again lead directly to cancellation of the brake pressure.

By way of the control unit disclosed here and the method according to the invention, it is thus possible in a straightforward way to ensure that the vehicle does not roll back undesirably in the so-called change-of-mind case. As a result of locking in the brake pressure, inconvenient (noticeable, detectable and audible) active build-ups of pressure as an alternative possible way of preventing rolling backward can additionally be avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for preventing an undesired vehicle motion during an automatic switch-off process of a drive machine in a motor vehicle, wherein the automatic switch-off process is initiated via a start-stop device before a standstill is reached if the motor vehicle is braked because of a deceleration request, and a speed of the vehicle is less than a predefined first speed threshold, so that the drive machine is switched off approximately as the vehicle reaches the standstill, the control unit comprising logic that:
   acquires a first signal indicating that the vehicle standstill will be reached within a first predetermined time;
   acquires a second signal indicating that an inability of the drive machine to operate in a self-sustaining manner will be reached within a second predetermined time because of the initiated automatic switch-off process of the drive machine; and causes a brake pressure of a predefined level in the braking system to be locked in when the first and second signals are acquired and to be maintained at the predefined level until a subsequent automatic switch-on process of the drive machine is completed and a drive torque is provided at such a level that the vehicle cannot roll backward or is again traveling forward.

2. The control unit as claimed in claim 1, further comprising logic that:
   acquires a third signal relating to the speed falling below a predefined second speed threshold, wherein locking-in of the brake pressure at the predefined level is caused if the third signal is additionally acquired.

3. The control unit as claimed in claim 2, further comprising logic that:
   acquires a fourth signal relating to a predefined slope threshold being exceeded, wherein locking-in of the brake pressure at the predefined level is caused if the fourth signal is additionally acquired.

4. The control unit as claimed in claim 3, further comprising logic that:
   acquires a fifth signal relating to a brake pedal actuation, wherein locking-in of the brake pressure at the predefined level is caused when a release of the brake pedal or a released brake pedal is additionally acquired.

5. The control unit as claimed in claim 4, wherein the level of the brake pressure is predefinable as a function of the slope.

6. The control unit as claimed in claim 5, wherein the locked-in brake pressure is withdrawn if a sixth signal relating to a defined drive torque of the drive machine being exceeded is acquired.

7. The control unit as claimed in claim 4, wherein the locked-in brake pressure is withdrawn if a sixth signal relating to a defined drive torque of the drive machine being exceeded is acquired.

8. The control unit as claimed in claim 1, further comprising logic that:
   acquires a fourth signal relating to a predefined slope threshold being exceeded, wherein locking-in of the brake pressure at the predefined level is caused if the fourth signal is additionally acquired.

9. The control unit as claimed in claim 1, further comprising logic that:
   acquires a fifth signal relating to a brake pedal actuation, wherein locking-in of the brake pressure at the predefined level is caused when a release of the brake pedal or a released brake pedal is additionally acquired.

10. The control unit as claimed in claim 1, wherein the level of the brake pressure is predefinable as a function of the slope.

11. The control unit as claimed in claim 1, wherein the locked-in brake pressure is withdrawn if a sixth signal relating to a defined drive torque of the drive machine being exceeded is acquired.

12. A method for preventing an undesired vehicle motion during an automatic switch-off process of a drive machine in a motor vehicle, wherein, via a start-stop device, an automatic switch-off process is initiated before a standstill is reached if the motor vehicle is braked because of a deceleration request and a speed of the vehicle is less than a predefined first speed threshold, so that the drive machine is switched off approximately as the vehicle standstill is reached, the method comprising the acts of:
   acquiring a first signal indicating that the vehicle standstill will be reached within a first predetermined time;
   acquiring a second signal indicating that an inability of the drive machine to operate in a self-sustaining manner will be reached within a second predetermined time because of the initiated automatic switch-off process of the drive machine; and
   causing a brake pressure of a predefined level in the braking system to be locked in if the first and second signal are acquired and to be maintained at the predefined level until a subsequent automatic switch-on process of the drive machine is completed and a drive torque is provided at such a level that the vehicle cannot roll backward or is again traveling forward.

13. The method as claimed in claim 12, further comprising the act of:
   acquiring a third signal relating to the speed falling below a predefined second speed threshold, wherein locking-in of the brake pressure at the predefined level is caused if the third signal is additionally acquired.

14. The method as claimed in claim 13, further comprising the act of:
   acquiring a fourth signal relating to a predefined slope threshold being exceeded, wherein locking-in of the brake pressure at the predefined level is caused if the fourth signal is additionally acquired.

15. The method as claimed in claim 14, further comprising the act of:
   acquiring a fifth signal relating to a brake pedal actuation, wherein locking-in of the brake pressure at the predefined level is caused when a release of the brake pedal or a released brake pedal is additionally acquired.

16. The method as claimed in claim 15, wherein the level of the brake pressure is predefinable as a function of the slope.

17. The method as claimed in claim 15, wherein the locked-in brake pressure is withdrawn if a sixth signal relating to a defined drive torque of the drive machine being exceeded is acquired.

* * * * *